United States Patent
Seo et al.

(10) Patent No.: US 7,609,945 B2
(45) Date of Patent: Oct. 27, 2009

(54) RECORDING MEDIUM, AND METHOD AND APPARATUS FOR REPRODUCING DATA FROM THE RECORDING MEDIUM

(75) Inventors: Kang Soo Seo, Anyang-si (KR); Jea Yong Yoo, Seoul (KR); Byung Jin Kim, Seongnam-si (KR); Seung Hoon Lee, Seongnam-si (KR)

(73) Assignee: LG Electronics Inc., Seoul (KR)

( * ) Notice: Subject to any disclaimer, the term of this patent is extended or adjusted under 35 U.S.C. 154(b) by 784 days.

(21) Appl. No.: 11/205,094

(22) Filed: Aug. 17, 2005

(65) Prior Publication Data

US 2006/0077873 A1 Apr. 13, 2006

Related U.S. Application Data

(60) Provisional application No. 60/601,993, filed on Aug. 17, 2004.

(30) Foreign Application Priority Data

Oct. 11, 2004 (KR) ...................... 10-2004-0080897
Oct. 28, 2004 (KR) ...................... 10-2004-0086688

(51) Int. Cl.
*H04N 7/00* (2006.01)
(52) U.S. Cl. ........................................ 386/124; 386/46
(58) Field of Classification Search .................. 386/46, 386/123–126, 55
See application file for complete search history.

(56) References Cited

U.S. PATENT DOCUMENTS

| 5,644,782 | A | 7/1997 | Yeates et al. |
| 5,930,768 | A | 7/1999 | Hooban |
| 5,982,980 | A | 11/1999 | Tada |
| 6,021,438 | A | 2/2000 | Duvvoori et al. |
| 6,269,371 | B1 | 7/2001 | Ohnishi |
| 6,775,803 | B1 | 8/2004 | Chung et al. |
| 6,928,613 | B1 | 8/2005 | Ishii et al. |
| 7,308,189 | B2 | 12/2007 | Ando et al. |

(Continued)

FOREIGN PATENT DOCUMENTS

CA 2373641 9/2001

(Continued)

OTHER PUBLICATIONS

Chinese Office Action corresponding to Chinese Application No. 200580031490.0 dated Aug. 8, 2008.

(Continued)

*Primary Examiner*—Thai Tran
*Assistant Examiner*—Mishawn Dunn
(74) *Attorney, Agent, or Firm*—Harness, Dickey & Pierce

(57) ABSTRACT

A recording medium, and a method and apparatus for reproducing data from the recording medium are disclosed. The recording medium includes a record area in which at least one first title and at least one second title having different attributes are recorded, and a reproduction management area for reproducing individual titles having different attributes. A static scenario and a dynamic scenario are recorded in the reproduction management area, wherein the static scenario is commonly applied to the first and second titles, and wherein the dynamic scenario is contained in each of the first and second titles.

13 Claims, 10 Drawing Sheets

U.S. PATENT DOCUMENTS

| | | |
|---|---|---|
| 2002/0161571 A1 | 10/2002 | Matsushima et al. |
| 2003/0072453 A1 | 4/2003 | Kelly et al. |
| 2003/0105743 A1 | 6/2003 | Ireton |
| 2003/0190148 A1 | 10/2003 | Lee |
| 2003/0202431 A1 | 10/2003 | Kim et al. |
| 2003/0228134 A1 | 12/2003 | Kim et al. |
| 2003/0235402 A1 | 12/2003 | Seo et al. |
| 2003/0235406 A1 | 12/2003 | Seo et al. |
| 2004/0047588 A1 | 3/2004 | Okada et al. |
| 2004/0051812 A1 | 3/2004 | Hayward |
| 2004/0054541 A1 | 3/2004 | Kryze et al. |
| 2004/0081434 A1 | 4/2004 | Jung et al. |
| 2004/0101285 A1 | 5/2004 | Seo et al. |
| 2004/0184778 A1 | 9/2004 | Jung et al. |
| 2004/0210584 A1 | 10/2004 | Nir et al. |
| 2004/0235402 A1 | 11/2004 | Bjelopavlic et al. |
| 2005/0025461 A1 | 2/2005 | Kato et al. |
| 2005/0105888 A1 | 5/2005 | Hamada et al. |
| 2005/0108466 A1 | 5/2005 | Takashima et al. |
| 2005/0196142 A1 | 9/2005 | Park et al. |
| 2005/0198071 A1 | 9/2005 | Yoo et al. |
| 2005/0198115 A1* | 9/2005 | Sugimoto et al. ........... 709/203 |
| 2006/0013562 A1 | 1/2006 | Sugino et al. |
| 2006/0045481 A1 | 3/2006 | Yahata et al. |
| 2006/0051062 A1 | 3/2006 | Kusaka et al. |
| 2006/0140079 A1 | 6/2006 | Hamada et al. |
| 2006/0143666 A1 | 6/2006 | Okada et al. |
| 2006/0153535 A1 | 6/2006 | Chun et al. |
| 2006/0227973 A1* | 10/2006 | Takashima et al. ......... 380/277 |
| 2006/0282775 A1 | 12/2006 | Yahata et al. |
| 2007/0217305 A1 | 9/2007 | Seo et al. |

FOREIGN PATENT DOCUMENTS

| | | |
|---|---|---|
| CN | 1111873 | 11/1995 |
| CN | 1179589 | 4/1998 |
| CN | 1898742 A | 1/2007 |
| EP | 0 737 912 | 10/1996 |
| EP | 0 737 975 | 10/1996 |
| EP | 0 801 384 | 10/1997 |
| EP | 1 032 229 | 8/2000 |
| EP | 1 408 505 | 4/2004 |
| EP | 1426961 A1 | 6/2004 |
| EP | 1437737 A2 | 7/2004 |
| EP | 1 513 152 | 3/2005 |
| EP | 1 524 669 | 4/2005 |
| EP | 1 536 427 | 6/2005 |
| EP | 1 553 769 | 7/2005 |
| EP | 1 718 074 | 11/2006 |
| JP | 11-065996 | 3/1999 |
| JP | 11-249948 | 9/1999 |
| JP | 11-249963 | 9/1999 |
| JP | 11-288580 | 10/1999 |
| JP | 2002288941 | 10/2002 |
| JP | 2004-214918 | 7/2004 |
| JP | 2006-040473 | 2/2006 |
| KR | 10-2004-0039885 | 5/2004 |
| RU | 2233011 | 7/2004 |
| TW | 583538 | 4/2004 |
| WO | WO 95/012197 | 5/1995 |
| WO | WO 96/11446 | 4/1996 |
| WO | WO 01/067668 | 9/2001 |
| WO | WO 2004/001752 | 12/2003 |
| WO | WO 2004/001754 | 12/2003 |
| WO | WO 2004/023479 | 3/2004 |
| WO | WO 2004/030356 | 4/2004 |
| WO | WO 2004/042723 | 5/2004 |
| WO | WO 2004/047100 | 6/2004 |
| WO | WO 2004/047104 | 6/2004 |
| WO | WO 2005/002220 | 6/2004 |
| WO | WO 2004/074976 | 9/2004 |
| WO | WO 2004/077436 | 9/2004 |
| WO | WO 2005/052941 | 9/2004 |
| WO | WO 2004/114658 | 12/2004 |
| WO | WO 2005/078727 | 2/2005 |
| WO | WO 2005/050528 | 6/2005 |
| WO | WO 2005/055205 | 6/2005 |
| WO | WO 2005/091637 | 9/2005 |
| WO | WO 2005/124763 | 12/2005 |

OTHER PUBLICATIONS

European Search Report corresponding to European Application No. 05787044.6 dated Jan. 29, 2009.

International Search report for PCT/KR 2005/002696 dated Dec. 5, 2005.

International Search report for PCT/KR 2005/002698 dated Dec. 5, 2005.

International Search report for PCT/KR 2005/002704 dated Dec. 30, 2005.

International Search report for PCT/KR 2005/002700 dated Jan. 13, 2006.

Office Action for Chinese Application 1111873 dated May 8, 2009 and English translation thereof.

Office Action for Chinese Application 1179589 dated May 8, 2009 and English translation thereof.

Notice of Allowance for Russian Application 2233011 dated Apr. 28, 2009 and English translation thereof.

* cited by examiner

RECORDING MEDIUM, AND METHOD AND APPARATUS FOR REPRODUCING DATA FROM THE RECORDING MEDIUM

This application claims the benefit of Korean Patent Application No. 10-2004-0080897, filed on Oct. 11, 2004, and No. 10-2004-0086688, filed on Oct. 28, 2004, which are hereby incorporated by reference as if fully set forth herein.

This application claims the benefit of U.S. Provisional Application No. 60/601,993, filed on Aug. 17, 2004, in the name of inventors Kang Soo SEO, Jae Yong Yoo, Byung Jin KIM, and Seung Hoon LEE entitled "METHOD OF CONFIGURING MANAGEMENT FILE IN BLU-RAY DISC", which is hereby incorporated by reference as if fully set forth herein.

BACKGROUND OF THE INVENTION

1. Field of the Invention

The present invention relates to a recording medium, and more particularly to a recording medium file structure for effectively reproducing data having different attributes recorded in the recording medium, and a method and apparatus for reproducing the data using the recording medium file structure.

2. Discussion of the Related Art

Generally, there has been widely used an optical disc acting as a recording medium capable of recording a large amount of data therein. Particularly, there has recently been developed a high-density optical recording medium capable of recording/storing high-quality video data and high-quality audio data for a long period of time, for example, a Blu-ray Disc (BD).

The BD based on the next-generation recording medium technique has been considered to be the next-generation optical recording solution capable of storing much more data than a conventional DVD. In recent times, many developers have conducted intensive research into the international standard technical specification associated with the BD along with those of other digital devices.

Particularly, the above-mentioned BD can record a plurality of data units having different attributes, for example, a first title wherein a movie compressed in an MPEG2 format is recorded, a second title wherein interactive information including movies executed by a Java program is recorded, a third title recorded by a Web-language.

However, a preferable recording medium file structure for reproducing the above-mentioned data (e.g., titles) having different attributes, and a method for reproducing data from the recording medium using the recording medium file structure are not yet well known to those skilled in the art, such that many limitations and problems occur in developing a BD-based optical recording/reproducing device.

SUMMARY OF THE INVENTION

Accordingly, the present invention is directed to a recording medium, and a method and apparatus for reproducing data from the recording medium that substantially obviate one or more problems due to limitations and disadvantages of the related art.

An object of the present invention is to provide a reproduction management file structure for managing reproduction of a plurality of data units having different attributes recorded in a recording medium.

Another object of the present invention is to provide a method for recording reproduction scenario information for reproducing data units having different attributes recorded in a reproduction management file structure.

A further object of the present invention is to provide a method and apparatus for reproducing data from a recording medium using the recording medium file structure.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a recording medium includes a record area in which at least one first title and at least one second title having different attributes are recorded, and a reproduction management area for reproducing individual titles having different attributes, wherein a static scenario and a dynamic scenario are recorded in the reproduction management area, the static scenario being commonly applied to the first and second titles, and the dynamic scenario being contained in each of the first and second titles.

Preferably, the first title is an HDMV title, and the second title is a Java title. The dynamic scenario includes locator information for designating a specific playlist file constructing the static scenario. The dynamic scenario includes locator information for designating a specific location contained in the playlist file.

In another aspect of the present invention, a recording medium includes a record area in which at least one title is recorded, and a reproduction management area for reproducing all titles contained in the record area, wherein a static scenario and a dynamic scenario are recorded in the reproduction management area, the static scenario including a plurality of playlist files to reproduce all the titles, and the dynamic scenario of individual titles including information associated with at least one accessible playlist file in order to reproduce a corresponding title from among the playlist files contained in the static scenario.

In another aspect of the present invention, a recording medium includes a record area in which at least one title is recorded, and a reproduction management area for reproducing all titles contained in the record area, wherein a static scenario and a dynamic scenario are recorded in the reproduction management area, the static scenario including a plurality of playlist files to reproduce all the titles, and the dynamic scenario of individual titles including locator information capable of designating one of the playlist files contained in the static scenario.

In another aspect of the present invention, a method for reproducing data of a recording medium in which a first title and a second title having different attributes are recorded independently of each other, a dynamic scenario contained in each of the titles having different attributes is recorded, and a static scenario commonly contained in the first and second titles irrespective of attribute information of individual titles includes the steps of (a) reading the dynamic scenario and the static scenario, and recognizing locator information, capable of designating the static scenario, contained in the dynamic scenario, and (b) reproducing a specific playlist file capable of constructing a corresponding static scenario designated by the locator information.

In a further aspect of the present invention, an apparatus for recording/reproducing data in/from a recording medium in which a first title and a second title having different attributes are recorded independently of each other, a dynamic scenario contained in each of the titles having different attributes is recorded, and a static scenario commonly contained in the first and second titles irrespective of, attribute information of individual titles includes a recording/reproducing unit for reading a dynamic scenario and a static scenario recorded in the recording medium, and a player model for reading locator information capable of designating the static scenario from the dynamic scenario, and reproducing a specific playlist file contained in a corresponding static scenario designated by the read locator information.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Figure 1:
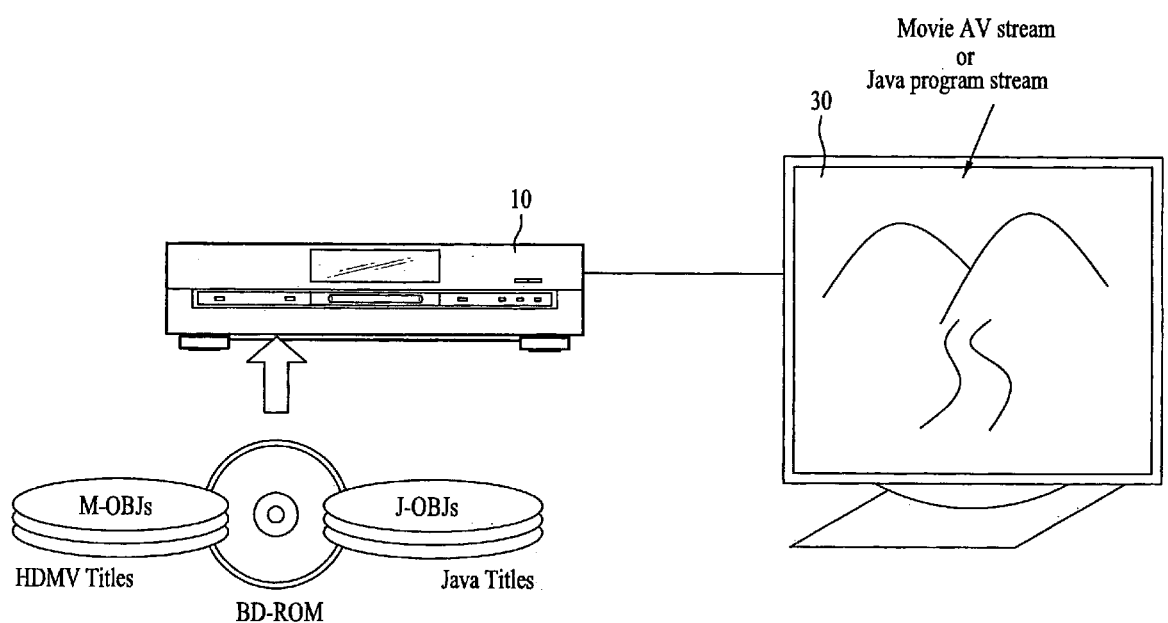
FIG. 1 is a conceptual diagram illustrating individual titles recorded in a recording medium according to the present invention.

Reference will now be made in detail to the preferred embodiments of the present invention, examples of which are illustrated in the accompanying drawings. Wherever possible, the same reference numbers will be used throughout the drawings to refer to the same or like parts.

Prior to describing the present invention, it should be noted that most terms disclosed in the present invention correspond to general terms well known in the art, but some terms have been selected by the applicant as necessary and will hereinafter be disclosed in the following description of the present invention. Therefore, it is preferable that the terms defined by the applicant be understood on the basis of their meanings in the present invention.

A recording medium for use in the present invention is indicative of all recordable mediums, for example, an optical disc, and a magnetic tape, etc., according to various recording schemes. For the convenience of description and better understanding of the present invention, the optical disc, such as a BD, will hereinafter be exemplarily used as the above-mentioned recording medium in the present invention. It should be noted that technical ideas of the present invention can be applied to other recording mediums without departing from the scope and spirit of the invention.

The term "Title" is indicative of a reproduction unit interfacing with a user, and each title is linked to a specific object, such that a stream associated with a corresponding title recorded in a disc is reproduced according to a command or program stored in the object.

A title recorded in a disc and a disc file structure for reproducing the title will be described with reference to FIG. 2. Particularly, for the convenience of description and better understanding of the present invention, a first title in which movies and interactive information according to an MPEG2 compression scheme are recorded is called an HDMV title, and a second title in which movies and interactive information according to a Java program are recorded is called a Java title.

The term "Object" is indicative of reproduction management information including a command or program for reproducing the disc. In other words, a variety of objects is present in a disc, linked to a specific title, or connected to other objects. Therefore, the above-mentioned objects are pre-designed according to intentions of a manufacturer or author of the disc, are recorded in the disc, and increase the number of scenarios for reproducing data of the disc. The term "Dynamic scenario" is indicative of the above-mentioned object.

For the convenience of description and better understanding of the present invention, the above-mentioned object for reproducing an HDMV Title will hereinafter be referred to as "Movie Object" or "M-OBJ", and the above-mentioned object for reproducing Java Title will hereinafter be referred to as "Java Object" or "J-OBJ".

Navigation information capable of reproducing a specific stream contained in a disc using a command or program stored in the object will hereinafter be referred to as a specific term "locator". The locator contained in the object "Movie Object" or "M-OBJ" is called an HDMV locator. The locator contained in the object "Java Object" or "J-OBJ" is called a Java locator.

FIG. 1 is a conceptual diagram illustrating individual titles recorded in a recording medium according to the present invention. In more detail, FIG. 1 shows an example of a BD-ROM for use in an optical recording/reproducing device 10.

FIG. 1 shows a specific mode in which a title recorded in the BD-ROM is mixed with an HDMV title and a Java title, such that the title mixed with the HDMV and JAVA titles is recorded. The specific mode is called a full mode. The present invention provides a file structure standardized in the disc in order to reproduce data from the BD-ROM based on the full mode, and provides a method and apparatus for reproducing data from the BD-ROM.

The optical recording/reproducing device 10 can record/reproduce data in/from various optical discs having different formats. If necessary, the optical recording/reproducing device 10 can record/reproduce specific data in/from only a specific optical disc such as a BD, or can reproduce the data from the optical disc without recording the data in the same. It should be noted that the present invention uses a BD-player capable of reproducing data from the BD-ROM based on a BD format as a preferred embodiment for the convenience of description. It is well known in the art that the optical recording/reproducing device 10 is also applicable to a driver embedded in a specific device such as a computer.

The optical recording/reproducing device 10 reproduces data from the BD-ROM, reads data from the BD-ROM, performs a signal process and a decoding process on the read data according to attribute information of the read data, and transmits the signal processed result and the decoding result to a display 30 connected to the optical recording/reproducing device 10, such that a user can view the signal processed result and the decoding result on the display 30.

Figure 2:
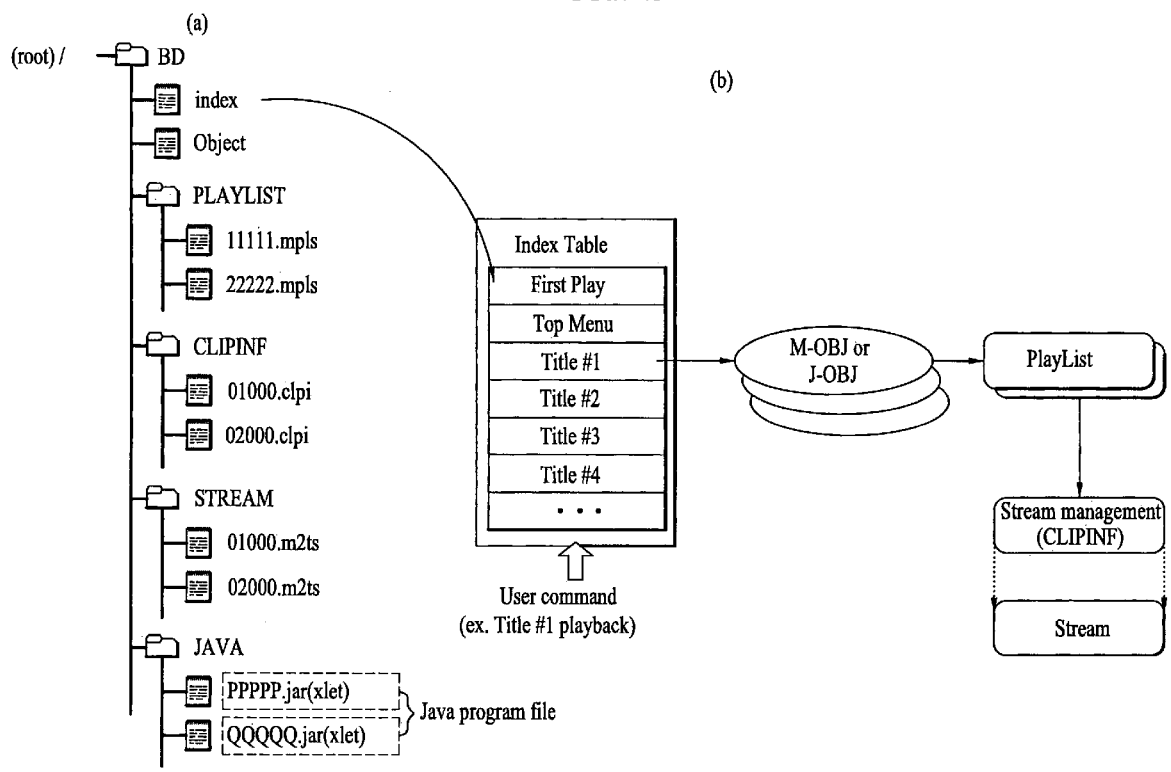
FIG. 2 is a conceptual diagram illustrating a file structure recorded in an optical disc acting as a recording medium and a relationship for reproducing data of the file structure according to the present invention.

FIG. 2 is a conceptual diagram illustrating a file structure (a) recorded in an optical disc such as BD-ROM and a relationship (b) among files stored in the file structure (a) when reproducing a specific title from the file structure (a) according to the present invention.

The above-mentioned file structure (a) shown in FIG. 2 will hereinafter be described.

The file structure (a) includes one or more BD directories in a single root directory. The BD directory includes not only an index file "index" acting as a general file (i.e., an upper file) capable of guaranteeing user interactivity, but also the above-mentioned object. The file structure (a) includes a variety of directories for storing information of actual data recorded in a disc and other information associated with a method for reproducing the data, for example, a playlist directory (PLAYLIST), a clip information directory (CLIPINF), a stream directory (STREAM), and a java directory (JAVA). The above-mentioned directories and a variety of files included in the directory will hereinafter be described.

The stream directory (STREAM) includes a plurality of AV (Audio and Video) stream files recorded in a disc according to a specific format. For example, the stream directory (STREAM) uses extension-names of stream files (01000.m2ts and 02000.m2ts) as a specific extension name "*.m2ts". Generally, the stream file records moving image data.

The clip information (Clip-info) directory (CLIPINF) is composed of a plurality of clip-info files (01000.clpi and 02000.clpi) connected to the above-mentioned stream files on a one-to-one basis. Particularly, the clip-info files (*.clpi) record attribute information and timing information of the stream files therein. The clip-info files (*.clpi) connected to the stream files (*.m2ts) on a one-to-one basis are generically named a "Clip". In other words, this means that a single stream file (*.m2ts) must correspond to a clip-info file (*clpi)

The playlist directory (PLAYLIST) includes a plurality of playlist files (*.mpls). Each playlist file (*.mpls) includes one or more playitems (PlayItem) for designating a playing interval during which a specific clip is reproduced. The playitem (PlayItem) includes information associated with a specific clip to be reproduced, i.e., information associated with a reproduction start time (IN-Time) and other information associated with a reproduction termination time (OUT-Time) of a clip determined to be a clip name (Clip_Information_File name) contained in the playitem (PlayItem)

The playlist file (*.mpls) is used as a basic reproduction management file unit contained in an overall file structure, such that it can reproduce a desired clip using a combination of one or more playitems. The playlist file (*.mpls) may include data different from reproduction data formed by the playitem. Particularly, the playlist file (*.mpls) may include a sub-playitem (SubPlayItem) for reproducing auxiliary data.

The playlist file (*.mpls) is operated by only a command or program of the above-mentioned object. From the viewpoint of a disc reproduction scenario, the object executes a dynamic scenario, and the playlist file (*.mpls) executes a static scenario.

The Java directory (JAVA) records a plurality of Java program files (e.g., PPPPP.jar or QQQQQ.jar) therein. A Variety of applications are programmed in individual Java program files, and each of the programmed applications may also be called a predetermined term "Xlet". The Java program files are executed by a dedicated reproduction device to be described later in FIG. 6B.

The reference character (b), shown in FIG. 2, shows a relationship for reproducing a specific title using the above-mentioned file structure (a) of FIG. 2. Specifically, upon receiving a title reproduction command from a user in association with a specific title applied to an index table of an index file, the relationship for reproducing the specific title is described in FIG. 2(b).

If data of a corresponding disc is loaded, the index file includes first play information "First Play" indicative of information associated with a first reproduction image, top menu information "TopMenu" capable of providing a title recorded in a disc with a menu image, and at least one title information (e.g., Title #1~Title #4). In more detail, the above-mentioned titles Title #1 ~Title #4 may be configured in the form of an HDMV title or a Java title.

Thereafter, if the user selects a specific title (e.g., Title #1), a specific playlist is reproduced according to a specific object command or program linked to the title (Title#1) in the object file of the file structure (a), and a specific clip "*clip" or "*.m2ts" is reproduced by a playitem contained in the playlist.

If the selected title (Title #1) is determined to be the HDMV title, it is reproduced by a specific object "M-OBJ" contained in a single object file. Otherwise, if the selected title (Title #1) is determined to be the Java title, it is reproduced by a specific object "J-OBJ".

Particularly, the present invention is characterized in that accessible playlist file name information and locator information are configured in the dynamic scenario to determine a playlist file (*.mpls) capable of constructing a static scenario associated with a specific title when the specific title is reproduced by an object (M-OBJ or J-OBJ) contained in the dynamic scenario. A detailed description thereof will be described with reference to FIGS. 4A to 6B.

Figure 3:
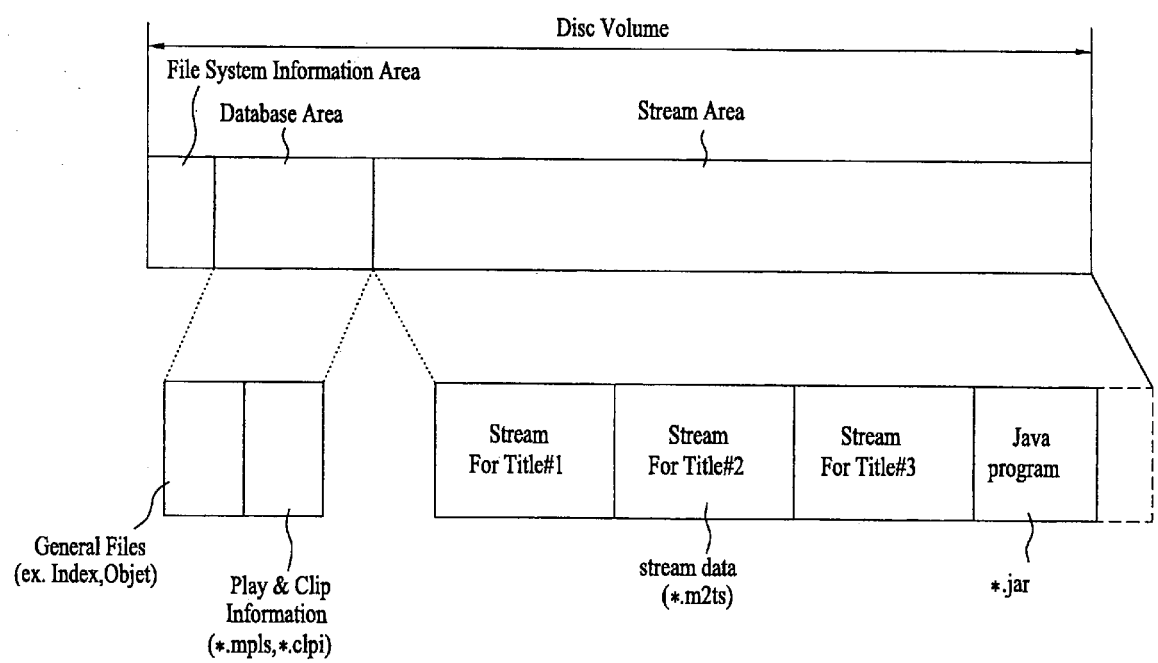
FIG. 3 is a structural diagram illustrating a data record structure recorded in an optical disc according to the present invention.

FIG. 3 is a structural diagram illustrating an exemplary disc structure for recording information associated with the file structure (a) in a disc. As shown in FIG. 3, from the viewpoint of an inner area of the disc, the above mentioned disc structure sequentially includes a file system information area serving as system information for managing overall files, a database area for recording an index file, an object file, a playlist file, and a clip-info file to reproduce a recorded stream (*.m2ts), and a stream area for recording a plurality of streams composed of audio data, video data, and graphic data, etc. Particularly, it should be noted that data recorded in the stream area of the disc may be determined to be data having different attributes as previously stated above.

A predetermined area for recording the HDMV title and the Java title is called a title record area, and corresponds to the above-mentioned stream area shown in FIG. 3. A predetermined area for recording file information for title reproduction is called a reproduction management area, and corresponds to the file system information area and the database area. It should be noted that individual areas shown in FIG. 3 have been provided to describe an example, and the present invention is not limited to an arrangement structure of the above-mentioned areas shown in FIG. 3, and is applicable to other examples as necessary.

FIGS. 4A to 4D are structural diagram illustrating individual file structures recorded in a disc according to the present invention. FIG. 4E is a conceptual diagram illustrating a reproduction relationship using the file structures shown in FIGS. 4A to 4D according to the present invention.

The file structures shown in FIGS. 4A to 4D are equal to those of FIG. 2(a), such that configuration of object files managing the dynamic scenario will be described.

Figure 4A:
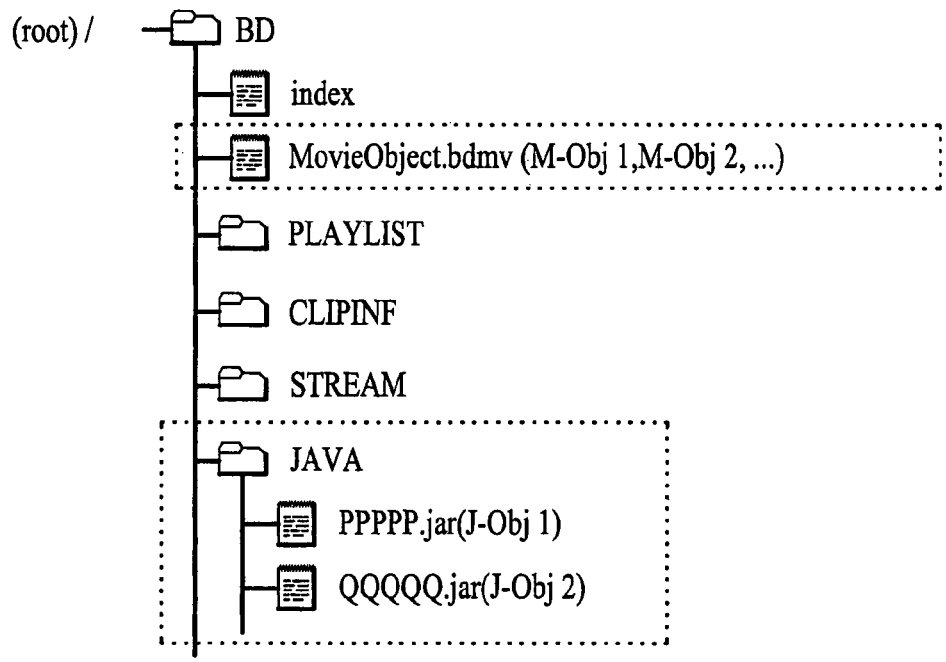
FIGS. 4A to 4D are structural diagrams illustrating individual file structures according to the present invention.

Referring to FIG. 4A, a first object (M-OBJ) for reproducing the HBMV title and a second object (J-OBJ) for reproducing the Java title are configured independently of each other. A plurality of first objects "M-OBJs" are included in a single movie object file (MovieObject.bdmv). A plurality of second objects "J-OBJs" are included in a corresponding. Java program file (*.jar). For example, data "J-OBJ 1" is included in the file "PPPPP.jar", and data "J-OBJ 2" is included in the file "QQQQQ.jar".

Figure 4B:
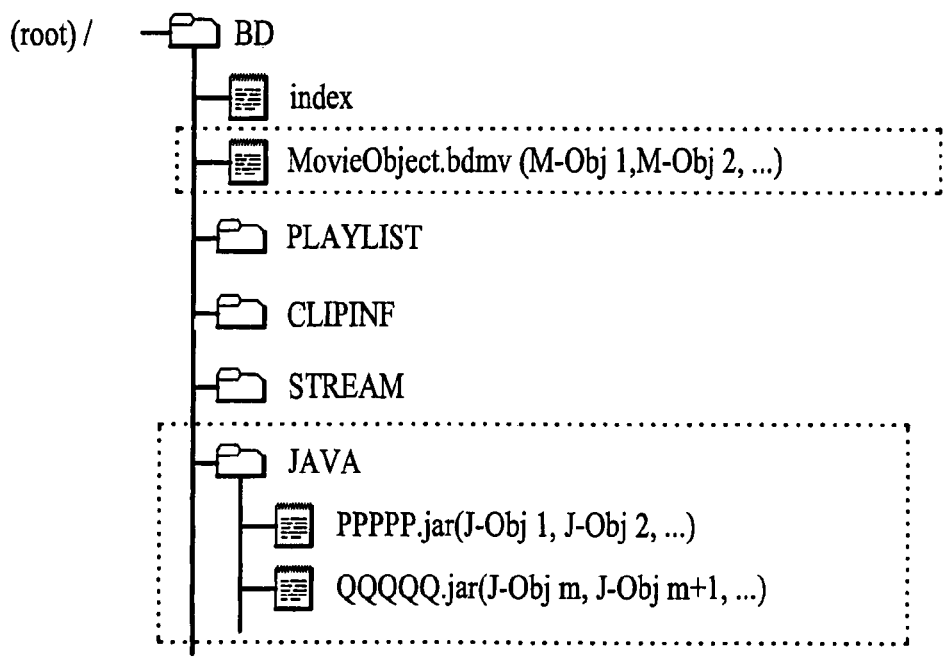

Compared with the file structure shown in FIG. 4A, FIG. 4B shows a plurality of J-OBJs, which may be contained in individual Java program files (*.jar) For example, a plurality of objects (e.g., J-OBJ, J-OBJ 2, . . . ) are configured in the file "PPPPP.jar", such that a disc capable of using various reproduction scenarios can be manufactured. But, in this case, a start object must be determined in the file "PPPPP.jar". For example, the first object "J-OBJ 1" may be used as a start object for executing the file "PPPPP.jar". The above-mentioned content may also be applied to another file "QQQQQ.jar".

Figure 4C:
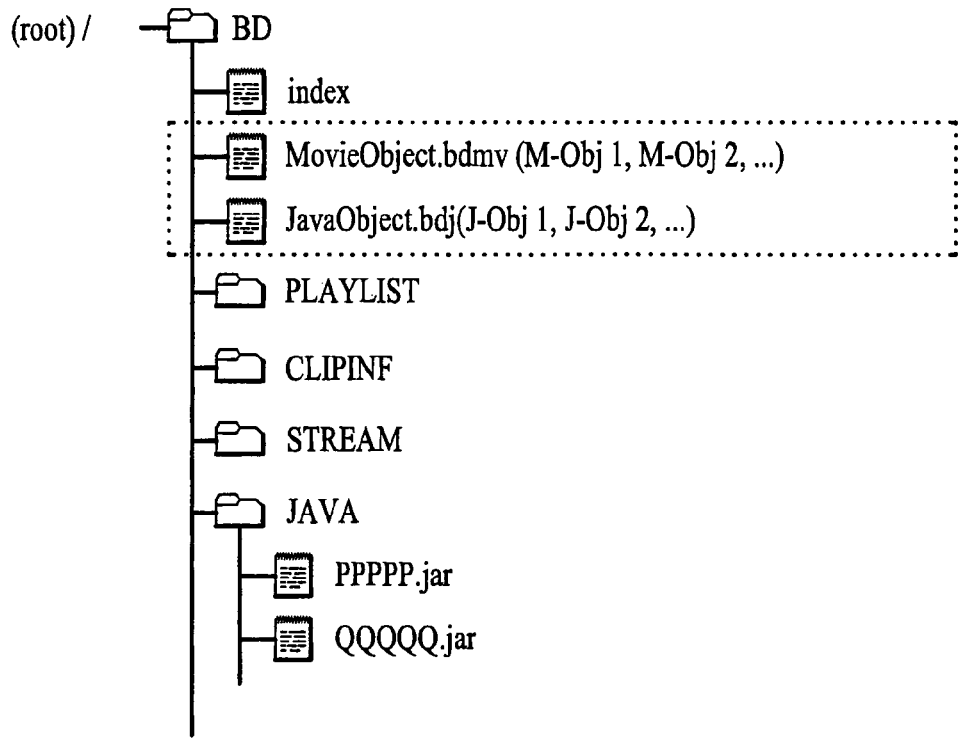
Figure 4D:
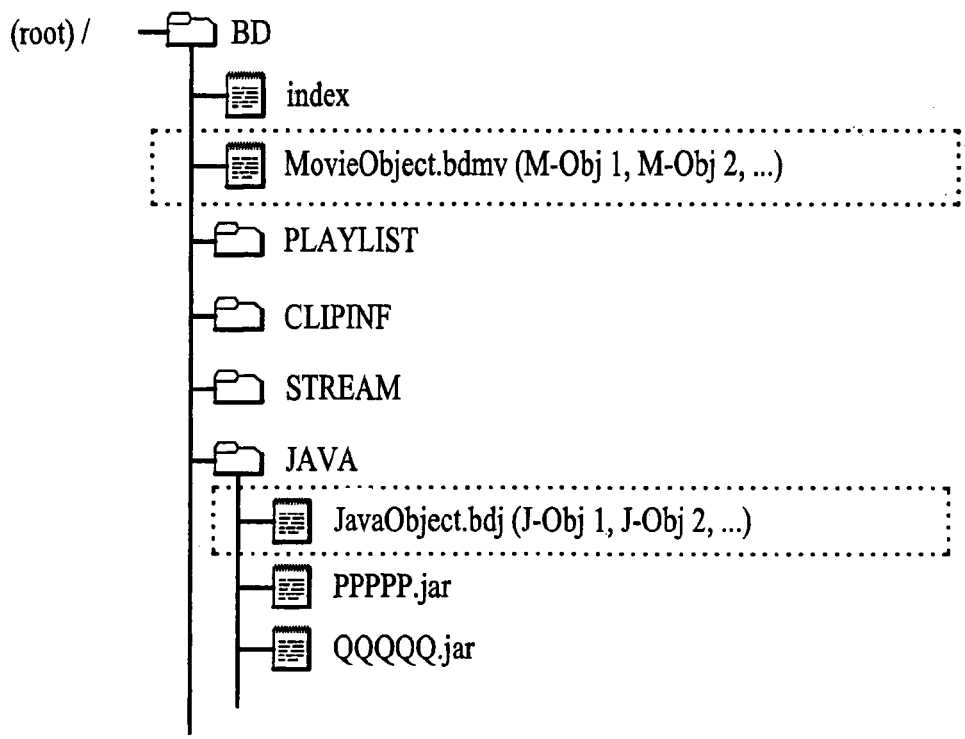
Figure 4E:
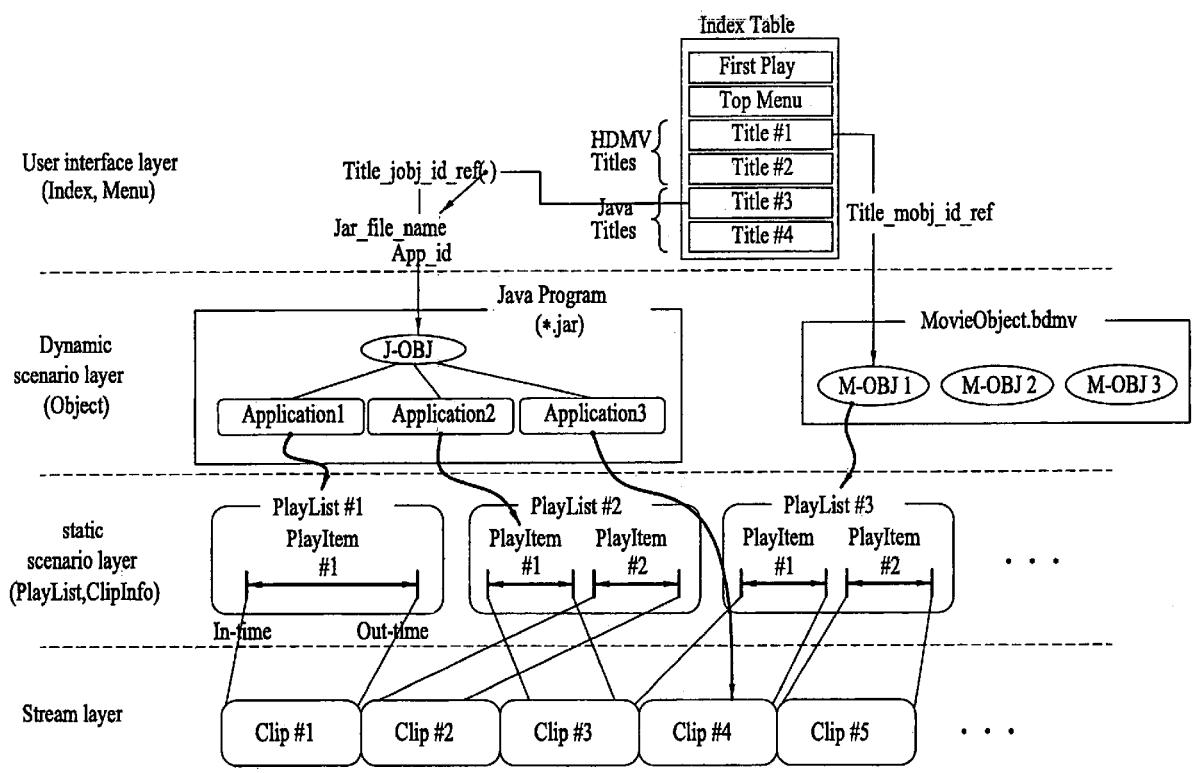
FIG. 4E is a conceptual diagram illustrating a reproduction relationship using the file structures shown in FIGS. 4A to 4D according to the present invention.

Compared with the file structure of FIG. 4A, the file structures shown in FIGS. 4C and 4D allows objects (J-OBJs) for reproducing the Java title to be included in additional object files (e.g., "Javaobject.bdj") in the same manner as in objects (M-OBJs) for reproducing the HDMV title.

In more detail, FIG. 4C shows the "Javaobject.bdj" file and the "MovieObject.bdmv" file arranged in a BD directory as general files. FIG. 4D shows the "MovieObject.bdmv" file arranged in the BD directory as a general file, and the "JavaObject.bdj" file arranged in the Java directory.

For another example, a single Java object file may be configured according to individual Java titles, and this example corresponds to a modification of the present invention as well known in the art.

FIG. 4E is a conceptual diagram illustrating a disc reproduction relationship using the file structure recorded in a disc according to the present invention. The relationship shown in FIG. 4E is depicted on the basis of the structure of FIG. 4A, and can also be applied to other examples shown in FIGS. 4B, 4C, and 4D. Particularly, in the case of using the file structures of FIGS. 4C and 4D, the Java object is not present in a Java program (*.jar), and may be configured in the form of an additional Java object file.

The disc reproduction relationship according to the file structure of the present invention is mainly classified into four layers, i.e., a stream layer, a static scenario layer, a dynamic scenario layer, and a user interface layer. The stream layer, the static scenario layer, the dynamic scenario layer, and the user interface layer will hereinafter be described.

The stream layer is indicative of a predetermined area for recording actual data therein, is a predetermined layer in which the above-mentioned stream file (*.m2ts) is recorded, and is called a "Clip" in FIG. 4E. More specifically the clip-info file (*clpi) contained in the clip may be included in the static scenario layer rather than the stream layer.

The static scenario layer is indicative of a predetermined area in which a fixed reproduction management file capable of reproducing data of the stream layer is recorded, and is a predetermined layer in which the above-mentioned playlist file (*.mpls) and the above-mentioned clip-info file (*.clpi) are recorded. Individual playlist files (*.mpls) include one or more playitems (PlayItems) capable of determining a playing interval during which a specific clip is reproduced. The playitem (PlayItem) includes a reproduction start time (IN-time) and a reproduction termination time (OUT-time) of a specific clip to be reproduced. The operation for reproducing disc data using the playlist file (*.mpls) means that the disc data is sequentially reproduced in the order of playitems according to a static scenario or a plurality of playitems are reproduced at random. In association with the above operation, the static scenario layer is characterized in that it includes a fixed scenario for reproducing a stream recorded in a disc, irrespective of title attribute information.

The dynamic scenario layer is defined by a disc author, and can define a disc reproduction scenario in various ways. The above-mentioned object information corresponds to the dynamic scenario layer. In other words, a time or condition for executing a playlist file contained in a specific static scenario is pre-defined in the dynamic scenario layer, such that a specific clip is reproduced using a corresponding playlist file on the condition that the pre-defined condition is satisfied. For example, when reproducing data of a disc including contents such as a game, a variety of streams differently reproduced according to game environment setup information or game progression is configured, such that the above-mentioned dynamic scenario layer is required to manage or control the above-mentioned various reproduction scenarios.

The user interface layer provides user interactivity, and provides a user with title category information and menu information recorded in the disc. The user can select a reproduction command on the basis of the received information. For example, an index file contained in the above-mentioned file structure corresponds to the user interface layer.

The user can recognize or control only the user interface layer. The remaining layers other than the user interface layer are prerecorded by a disc author, and their data cannot be recognized by the user. Therefore, if the user selects a specific title reproduction command using the user interface layer, the static scenario layer is executed via the dynamic scenario layer, a stream contained in the stream layer is reproduced according to scenario information of the static scenario layer.

Internal operations of the disc capable of performing a predetermined operation associated with a user-selected specific title will hereinafter be described. If the user selects the HDMV title from among a plurality of titles (e.g. HDMV titles #1 and #2 and Java titles #3 and #4) recorded in the disc, or selects the Java title from among the titles, different reproduction scenario flows are established. The different reproduction scenario flows will hereinafter be described.

If the disc having the file structure of FIG. 4C is seated in the optical recording/reproducing device 10, and a predetermined title (Title #1) indicative of the HDMV title is reproduced upon receiving a title selection command from the user, the object "M-OBJ 1" linked to the title #1 must firstly be executed. In order to execute the object "M-OBJ 1", specific information "Title_mobj_id_ref" capable of loading the object linked to the title #1 must be recorded in a syntax of the title #1. In association with the above-mentioned operation, the object "M-OBJ 1" is included in a single "MovieObject.bdmv" file as previously stated above.

If the disc having the above-mentioned file structure is seated in the optical recording/reproducing device 10, and a predetermined title (Title #3) indicative of the Java title is reproduced upon receiving a title selection command from the user, the object "J-OBJ 1" linked to the title #3 must firstly be executed. In order to execute the object "J-OBJ 1", specific information "Title_jobj_id_ref( )" or "Title_bdjo_file_name" capable of loading the object linked to the title #3 must be recorded in a syntax of the title #3. In association with the above-mentioned operation, according to the file structures shown in FIGS. 4A and 4B, the object "J-OBJ 1" is included in a single "PPPPP.jar" file as a corresponding Java program file. Therefore, the "Title_jobj_id_ref( )" information includes first information (e.g., "Jar_file_name") for designating a Java program file including a corresponding object "J-OBJ" and second information for designating specific applications (Applications). According to the file structures shown in FIGS. 4C and 4D, the "J-OBJ 1" object is used as a Java object file. Therefore, a corresponding Java object file is executed via the above-mentioned "Title_bdjo_file_name". In other words, the above-mentioned Java object file includes first information (e.g., "jar_file_name") for designating a specific java program file and second information (e.g., "App_id") for designating specific applications.

Therefore, a command for finally reproducing the playlist file is executed by the "M-OBJ" object in the case of the HDMV title, and is executed by specific applications designated by the "J-OBJ" object in the case of the Java title.

A detailed relationship for finally reproducing a stream file using the above-mentioned object information (M-OBJ or J-OBJ) will hereinafter be described with reference to FIGS. 5A and 5B.

Figure 5A:
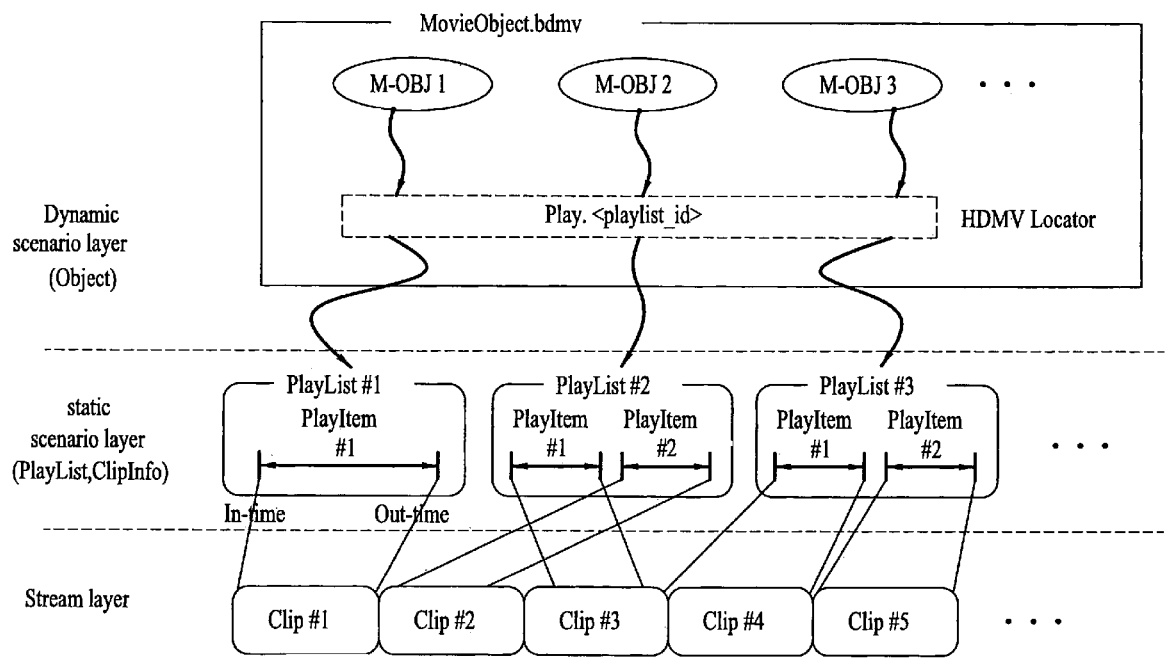
FIG. 5A exemplarily shows a dynamic scenario and a static scenario for reproducing an HDMV title according to the present invention.

FIG. 5A exemplarily shows a dynamic scenario and a static scenario for reproducing the HDMV title according to the present invention. Particularly, FIG. 5A shows a process for executing playlist files using the movie object "M-OBJ".

For the convenience of description, the remaining layers other than the user interface layer from among the above-mentioned four layers shown in FIG. 4E are depicted in FIG. 5A. Specifically, FIG. 5A shows operations of the movie object "M-OBJ" contained in the dynamic scenario layer when a user selects a command for reproducing a specific HDMV title. All the movie objects (M-OBJs) contained in a dynamic scenario associated with reproduction of the HDMV title are contained in a single movie object file "MovieObject.bdmv". Each movie object (M-OBJ) is composed of a unique command. The movie object (M-OBJ) includes a command for executing a specific playlist file associated with the specific title, for example, a command. "Play.<playlist_id>". As described above, if the playlist #1 is executed by the "M-OBJ 1" object, a playitem #1 contained in the playlist #1 is executed, such that a specific clip #1 is reproduced during a predetermined interval from a presentation start time (IN-time) to a presentation end time (OUT-time) prescribed in the playitem Specifically, a disc reproduction command contained in the movie object (M-OBJ) may also be called an HDMV locator. Preferably, the HDMV locator is defined as only the above-mentioned command "Play.<playlist_id>". Therefore, in order to access a playitem or clip lower than the playlist, the above-mentioned static scenario layer is required.

Figure 5B:
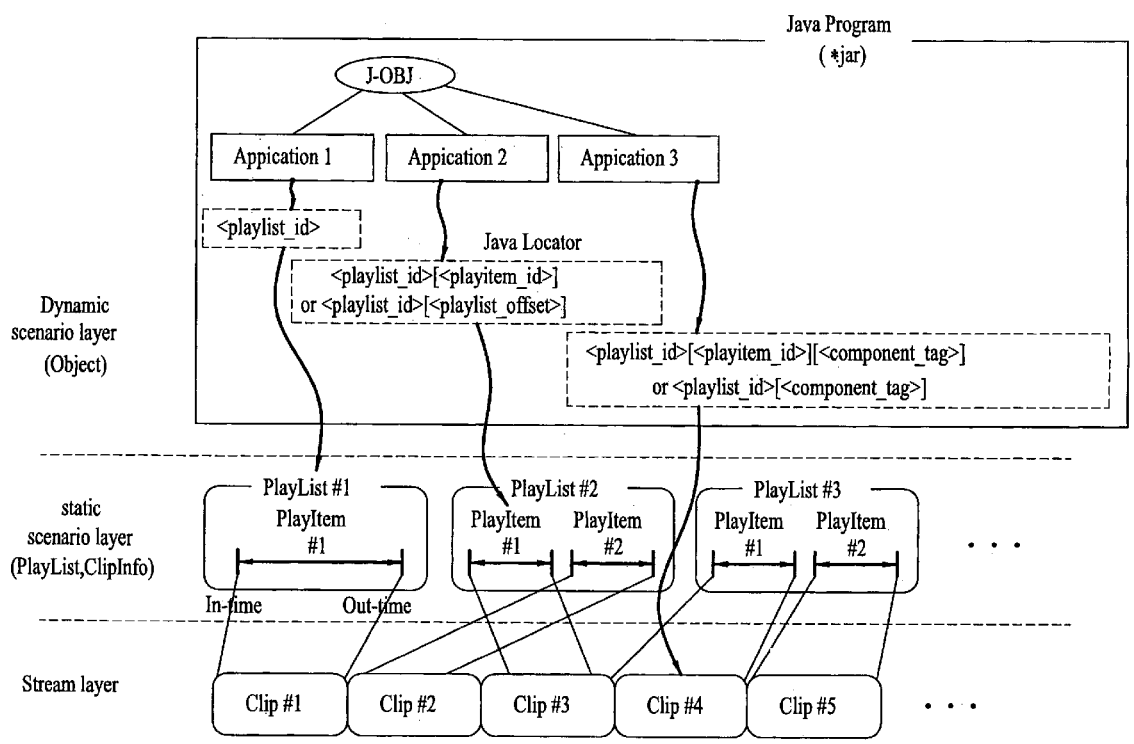
FIG. 5B exemplarily shows a dynamic scenario and a static scenario for reproducing a Java title according to the present invention.

FIG. 5B is a conceptual diagram illustrating a scenario for reproducing the Java title. Specifically, FIG. 5B shows a process for reproducing playlist files and streams using the Java object "J-OBJ".

For the convenience of description, the remaining layers other than the user interface layer from among the above-mentioned four layers shown in FIG. 4E are depicted in FIG. 5A. Specifically, FIG. 5B shows operations of the Java object "J-OBJ" contained in the dynamic scenario layer when a user selects a command for reproducing a specific Java title.

The Java object "J-OBJ" contained in a dynamic scenario associated with reproduction of the Java title includes specific information capable of executing at least one from among a plurality of application programs. Therefore, a specific application program is executed by the Java object "J-OBJ", and navigation information capable of designating a specific playlist and a specific playitem is recorded in the application program.

The above-mentioned navigation information recorded in the Java application is called a Java locator or a BDJ locator, and has the following characteristics.

Firstly, the Java locator basically includes information for designating a specific playlist file contained in a static scenario. In other words, in order to execute the Java title, a playlist file name or playlist file number associated with the Java title must be determined. For example, a first application program (Application 1) uses only specific information <playlist_id> for designating the playlist #1 as the Java locator. Therefore, a specific stream will be reproduced according to the static scenario of the playlist #1 designated by the first application program (Application 1).

Secondly, the Java locator can directly access a playitem contained in the playlist, or can also directly access a clip whose reproduction is managed by the playitem. Compared with the HDMV locator (ref. FIG. 5A) capable of executing only the playlist, the above-mentioned characteristics of the Java locator shown in FIG. 5B are considered to be one unique characteristic of the present invention.

For example, the second application program (Application 2) shows a specific case in which specific information "<playlist_id>[playitem_id>]" or "<playlist_id>[<playlist_offset>]" for designating a specific position contained in the playlist #2 is used as the Java locator. Therefore, the specific information "<playlist_id>[<playitem_id>]" or "<playlist_id>[<playlist_offset>]" will be reproduced from a specific location lower than that of the playlist #2 designated by the second application program (Application 2).

In association with the above-mentioned description, the "<playlist_id>[<playitem_id>]" information designates one of a plurality of playitems contained in the playlist, and is indicative of a Java locator capable of directly accessing a specific playitem stored in the playlist. The "<playlist_id>[<playlist_offset>]" information designates an access pointer designated by a specific location different from a front location of the playlist, for example, an access pointer designated by a playlist mark, and is used as a Java locator capable of directly accessing a specific location contained in the playlist.

For example, the third application program (Application 3) shows a specific case in which specific information "<playlist_id>[<playitem_id>][<component_tag>]" or "<playlist_id>[<component_tag>]" for designating a specific position contained in the playlist #3 is used as the Java locator. Therefore, the specific information "<playlist_id>[<playitem_id>][<component_tag>]" or "<playlist_id>[<component_tag>]" will be reproduced from a specific location lower than that of the playlist #2 designated by the second application program (Application 2).

In association with the above-mentioned operations, the "<playlist_id>[<playitem_id>][<component_tag>]" information is indicative of a Java locator capable of directly accessing a specific clip reproduced by a specific playitem stored in the playlist.

The "<playlist_id>[<component_tag>]" information acts as specific information capable of directly designating a location of a stream having specific data contained in the playlist, for example, a specific language stream, a specific angle stream, or a specific text subtitle stream, etc. The "<playlist_id>[<component_tag>]" information serves as a java locator for directly accessing a specific location contained in the playlist.

As stated above, the Java locator can directly designate a specific playlist or a specific location contained in the playlist, and can access the designated playlist or location. A disc author can construct a more detailed dynamic scenario.

In order to designate a specific playlist or a specific location contained in the playlist using the Java locator, accessible playlist information is firstly required. The above-mentioned accessible playlist information is called "Table_Of_Accessible_PlayList". The "Table_Of_Accessible_PlayList" information is recorded in the Java object. For example, as shown in FIG. 4E, a plurality of playlists #1, #2, and #3 act as playlists managed by the above-mentioned "Table_Of_Accessible_PlayList" information.

Figure 6A:
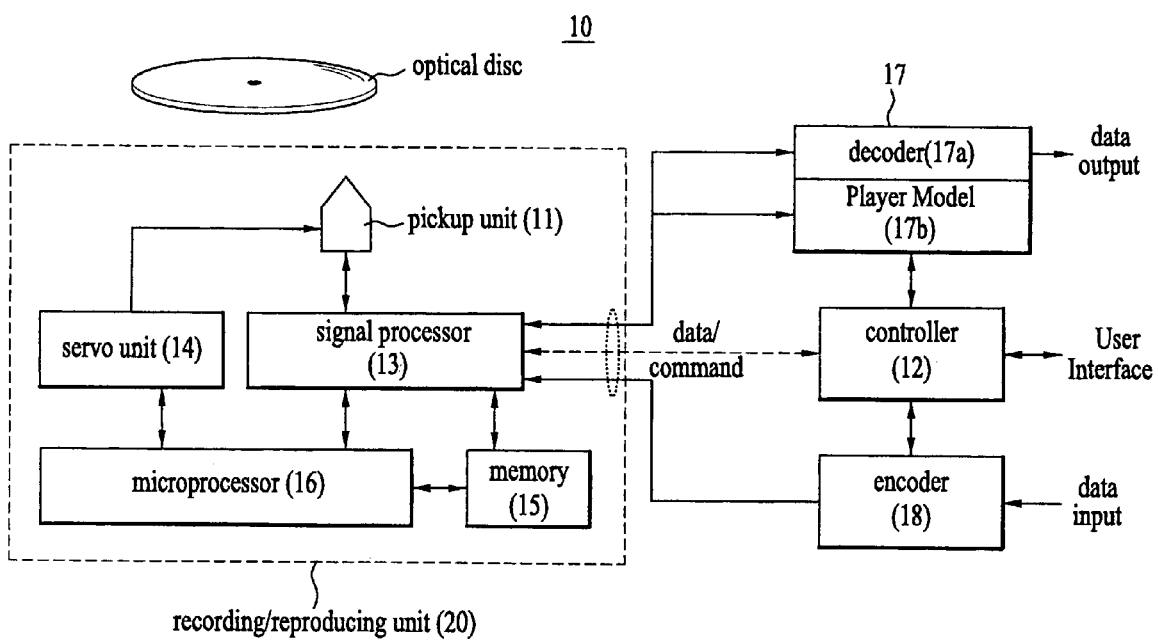
FIG. 6A is a block diagram illustrating an optical recording/reproducing device according to the present invention.
Figure 6B:
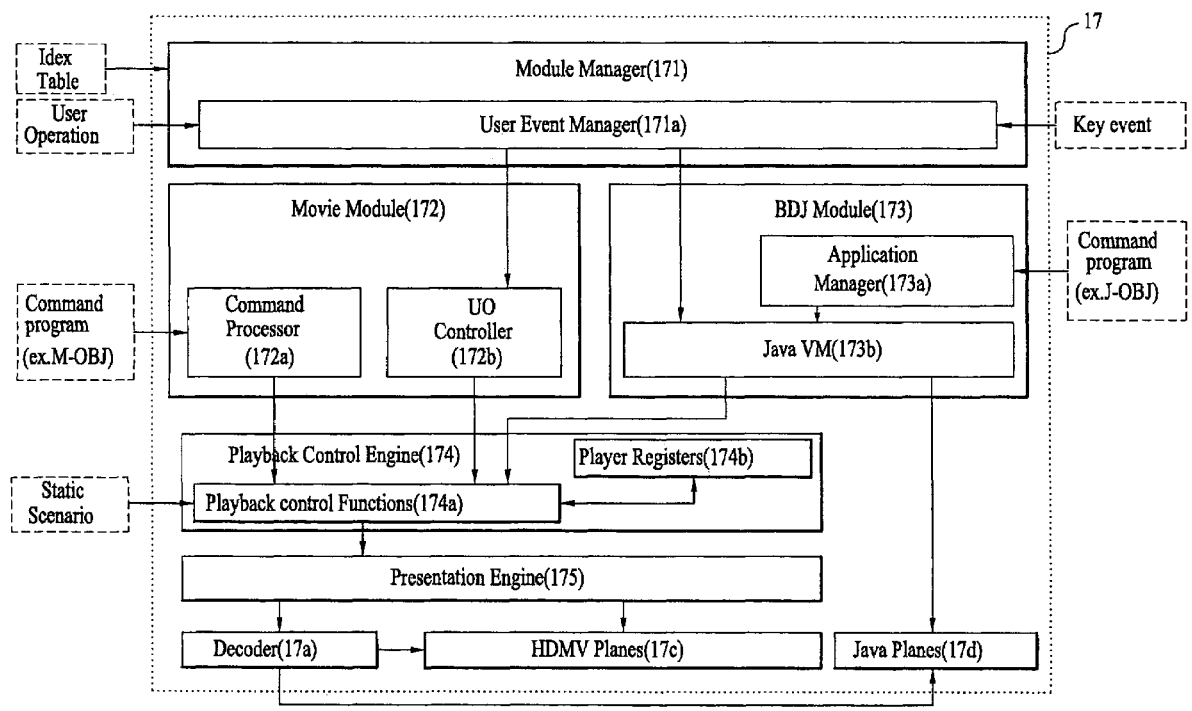
FIG. 6B is a block diagram illustrating a player model according to the present invention.

FIGS. 6A and 6B show an optical recording/reproducing device according to the present invention. In more detail, FIG. 6A is a block diagram illustrating the optical recording/reproducing device 10 according to the present invention. FIG. 6B is a block diagram illustrating a reproduction processor 17 for reproducing data of a disc in which titles having different attributes are recorded, or a player model according to the present invention.

Referring to FIG. 6A, the optical recording /reproducing device 10 includes a pickup unit 11, a servo unit 14, a signal processor 13, a memory 15, and a microprocessor 16. The pickup unit 11 reads data recorded in a title record area of an optical disc, and reads management information including file information recorded in a reproduction management area. The servo unit 14 controls operations of the pickup unit 14. The signal processor 13 receives a reproduction signal from the pickup unit 11, restores the received reproduction signal to a desired signal value, or modulates a signal to be recorded into another signal recorded in the optical disc, such that it transmits the recovered or modulated result. The memory 15 stores information needed for reproducing data of the disc. The microprocessor 16 controls overall operations of the above-mentioned components contained in the optical recording/reproducing device 10. In association with the above-mentioned operations, the combination of the above-mentioned components 11, 14, 13, 15, and 16 is also called a recording/reproducing unit 20, and the recording/reproducing unit 20 can be manufactured in the form of a single product.

A controller 12 controls all the constituent components shown in FIG. 6A. Specifically, the controller 12 receives a reproduction command of a specific title by interfacing with a user according to the present invention.

The reproduction processor 17 finally decodes output data upon receiving a control signal from the controller 12, and transmits the decoded result to the user. The reproduction processor 17 includes a decoder 17a for decoding AV signals, and a player model 17b for analyzing a command or program contained in the object and a user command received from the controller 12 in association with reproduction of the above-mentioned specific title, and determining a reproduction direction on the basis of the analyzed result. However, it should be noted that the player model 17b may include the decoder 17a in some preferred embodiments, and the reproduction processor 17 may correspond to the player model shown in FIG. 6B.

An encoder 18 converts an input signal into a specific format signal (e.g., an MPEG2 transport-stream) upon receiving a control signal from the controller 12, and transmits the converted result to the signal processor 13, such that it can record a desired signal in the optical disc.

FIG. 6B is a detailed block diagram of the player model according to the present invention. The player model includes a module manager 171, a movie module 172, a BDJ module 173, a playback control engine 174, and a presentation engine 175. FIG. 6B shows a player model based on a full mode during which even the Java title can be reproduced, and a detailed description thereof will hereinafter be described.

The movie module 172 acting as an additional reproduction process module capable of reproducing the HDMV title and the BDJ module 173 acting as an additional reproduction process module capable of reproducing the Java title are constructed independently of each other. The movie module 172 receives a command or program contained in the above-mentioned object "M-OBJ", and the BDJ module 173 receives a command or program contained in the above-mentioned object "J-OBJ", such that the movie module 172 and the BDJ module 173 process the received command or program.

The movie module 172 includes a command processor 172a, and the BDJ module 173 includes an application manager 173a and a JAVA VM 173b, such that the movie module 172 and the BDJ module 173 are capable of receiving/processing the above-mentioned command or program.

Particularly, the application manager 173a analyzes an application program contained in a Java program including the above-mentioned Java locator, and controls the Java VM 173b to reproduce the application program. When reading a Java locator for reproducing a specific playlist file or data of a specific location lower than that of a playlist, the application manager 173b controls the Java VM 173b to reproduce a corresponding stream using the playback control engine 174.

The module manager 171 transmits a user command to the movie module 172 and the BDJ module 173, and controls operations of the movie module 172 and the BDJ module 173.

The playback control engine 174 analyzes playlist file content (associated with a static scenario) recorded in a disc upon receiving a reproduction command from the movie module 172 and the BDJ module 173, and performs a reproduction function on the basis of the analyzed result. The playback control engine 174 includes a playback control function 174a for managing all the reproduction operations; a player status register (PSR) for indicating a reproduction environment or reproduction status of the player; and a player register 174b for storing general purpose register (GPR) information. The playback control function 174b may also be indicative of the playback control engine 174 as necessary.

A presentation engine 175 performs predetermined presentation using a display, such that it can provide a user with a specific stream whose reproduction is managed by the playback control engine 174.

The module manager 171, the movie module 172, the BDJ module 173, and the playback control engine 174 contained in the player model shown in FIG. 6B can be processed by, software. It is preferable that the above-mentioned components 171, 172, 173, and 174 are processed by software instead of hardware. The presentation engine 175, the decoder 17a, and the graphic planes 17c and 17d are generally hardware based. Constituent components (e.g., 171, 172, 173, and 174) processed by software may be integrated in one unit, such that the integrated unit may be installed into the controller 12. Therefore, it should be noted that the above-mentioned components of the present invention be understood on the basis of their meanings, and are not limited to their implementation methods such as hardware or software implementation.

The HDMV title and the Java title receive user commands based on different schemes, respectively. The HDMV title and the Java title use different methods for performing individual user commands. There is needed a predetermined unit capable of receiving the user command, and transmitting the received user command to either the movie module 172 or the BDJ module 173. In this case, the above-mentioned operations are performed by the user event manager 171*a* contained in the module manager 171. For example, if the received command is determined to be a user command entered by a User Operation (UO), the user event manager 171*a* transmits the user command to a UO controller 172*b* contained in the movie module 172. Otherwise, if the received command is determined to be a user command entered by a key event, the user event manager 171*a* transmits the received user command to the Java VM 173*b* contained in the BDJ module 173.

One of the modules 172 and 172 manages the above-mentioned playback control engine 174. In more detail, when reproducing the HDMV title, the movie module 172 acts as a master of the playback control engine 174. When reproducing the Java title, the BDJ module 173 acts as a master of the playback control engine 174.

The graphic plane is independently managed. For example, the HDMV plane 17*c* controls the presentation engine 175 to act as a master, and controls the Java plane 17*d* to act as a master of the Java VM 173*b* contained in the BDJ module 173.

A method for reproducing data of the optical disc using the above-mentioned optical recording/reproducing device will hereinafter be described. If a disc in which a reproduction management file structure shown in one of FIGS. 2, 4A, 4B, 4C, 4D, and 4E is recorded is loaded in the optical recording/reproducing device, the microprocessor 16 reads reproduction management file information recorded in the loaded disc using the pickup unit 11, and stores the read reproduction management file information in the memory 15. Upon receiving a user selection command for reproducing a Unspecific title from the controller 12, the microprocessor 16 reads specific data according to a reproduction scenario corresponding to the selected title, and transmits the read data to the player model shown in FIG. 6B. Thereafter, the player model shown in FIG. 6B recognizes a reproduction scenario on the basis of various information of a corresponding title, for example, an attribute, a dynamic scenario acting as an object file, and a static scenario acting as a playlist file, drives one of the movie module 172 and the BDJ module 173 according to the reproduction scenario, and finally reproduces a user-selected title.

In association with the above-mentioned operations, the object file of the dynamic scenario includes a locator acting as navigation information capable of designating a specific playlist file of the static scenario. Specifically, the Java locator for reproducing the Java title can directly designate both the playlist file and a specific location contained in the playlist, whereas the HDMV locator for reproducing the HDMV title can designate only the playlist file.

As apparent from the above description, the present invention firstly reads the above-mentioned locator information (i.e., an HDMV locator or a Java locator), and finally reproduces data of a disc according to a reproduction scenario designated by the read locator information (i.e., an HDMV locator or a Java locator).

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A recording medium storing a data structure for managing reproduction of titles having different data formats by a reproducing apparatus comprising:
    a stream layer including a first clip for a movie title according to an MPEG-2 compression scheme and a second clip for a java title according to a java program;
    a playlist layer including a first playlist for managing reproduction of the movie title by the reproducing apparatus and a second playlist for managing reproduction of the java title by the reproducing apparatus, the first playlist including a first playitem identifying a playing interval in the first clip;
    an object layer including a movie object for the movie title and a java object for the java title, the movie object including a first command for executing the first playlist, and the java object including a second command for executing the second playlist; and
    a user interface layer including an index table, the index table including a first title information for selecting the movie title and a second title information for selecting the java title.

2. The recording medium according to claim 1, wherein the movie object includes locator information for designating the first playlist.

3. The recording medium according to claim 1, wherein the java object includes locator information for designating the second playlist.

4. The recording medium according to claim 1, wherein the java object includes locator information for designating a specific location of the second playlist.

5. The recording medium according to claim 4, wherein the specific location is determined on the basis of the second playitem.

6. The recording medium according to claim 4, wherein the specific location is determined on the basis of a specific stream contained in the second clip.

7. The recording medium according to claim 3, wherein the locator information is included in a java application program.

8. A method for reproducing data of a recording medium storing a data structure, the method comprising:
    reading, by a reproducing apparatus, first title information for executing a movie object for a movie title according to an MPEG-2 compression scheme from an index table of a user interface layer;
    reading the movie object, the movie object including a first command for executing a first playlist from an object layer;
    reading the first playlist from a playlist layer, the first playlist including a first playitem identifying a playing interval in a first clip for the movie title;
    reproducing the first clip from a stream layer;
    reading, by the reproducing apparatus, second title information for executing a java object for a java title according to a java program from the index table;
    reading the java object, the java object including a second command for executing a second playlist from the object layer;

reading the second playlist from the playlist layer, the second playlist including a second playitem identifying a playing interval in a second clip for the java title;

reproducing the second clip from the stream layer.

9. The method according to claim 8, wherein the movie object includes locator information designating the first playlist.

10. An apparatus for reproducing data from a recording medium storing a data structure the apparatus comprising:

a pickup unit configured to read data from the recording medium; and a controller configured to control the pickup unit to read first title information for executing a movie object for a movie title according to an MPEG-2 compression scheme and second title information for executing a java object for a java title according to a java program from an index table of a user interface layer, read the movie object, the movie object including a first command for executing a first playlist and the java object, the java object including a second command for executing a second playlist from an object layer, read the first playlist and the second playlist from a playlist layer, the first playlist including a first playitem identifying a playing interval in a first clip for the movie title, and the second playlist including a second playitem identifying a playing interval In a second clip for the java title, and reproduce the first clip and the second clip from a stream layer.

11. The apparatus according to claim 10, wherein the movie object includes a locator information designating the first playlist.

12. A method for recording data on a recording medium, the method comprising:

recording, by a recording apparatus, a first clip for a movie title according to an MPEG-2 compression scheme and a second clip for a java title according to a java program;

recording a first playlist for the movie title and a second playlist for the java title, the first playlist including a first playitem identifying a playing interval in the first clip, and the second playlist including a second playitem identifying a playing interval in the second clip;

recording a movie object for the movie title and a java object for the java title, the movie object including a first command for executing a first playlist, and the java object including a second command for executing a second playlist; and recording an index table including first title information for selecting the movie title and second title information for selecting the java title.

13. An apparatus for recording data on a recording medium, the apparatus comprising:

a pickup unit configured to record data on the recording medium; and a controller configured to control the pickup unit to record a first clip for a movie title according to an MPEG-2 compression scheme and a second clip for a java title according to a java program, record a first playlist for the movie title and a second playlist for the java title, the first playlist including a first playitem identifying a playing interval in the first clip, and the second playlist including a second playitem identifying a playing interval in the second clip, record a movie object for the movie title and a java object for the java title, the movie object including a first command for executing a first playlist, and the java object including a second command for executing a second playlist, and record an index table including first title information for selecting the movie title and second title information for selecting the java title.

* * * * *